(12) United States Patent
DeJager

(10) Patent No.: US 6,839,353 B1
(45) Date of Patent: Jan. 4, 2005

(54) METHOD AND APPARATUS FOR PACKET NETWORK TUNNEL MANAGEMENT

(75) Inventor: Dale Scott DeJager, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/573,759

(22) Filed: May 18, 2000

(51) Int. Cl.$^7$ .............................................. H04L 12/56
(52) U.S. Cl. .................................................. 370/395.21
(58) Field of Search ................................ 370/216, 217, 370/218, 229, 351, 355, 356, 389–392, 397–395.31, 395.41–355.43, 395.51–395.65, 422, 474, 475, 395.1, 395.2, 395.21, 395.3, 395.32, 468, 401, 400, 230; 709/200, 203, 204, 207, 226, 229, 234–246

(56) References Cited

U.S. PATENT DOCUMENTS 5,687,167 A * 11/1997 Bertin et al. ................. 370/254
6,092,113 A * 7/2000 Maeshima et al. ........... 709/230
6,278,712 B1 * 8/2001 Takihiro et al. .............. 370/400
6,538,996 B1 * 3/2003 West et al. ................... 370/238
6,665,273 B1 * 12/2003 Goguen et al. .............. 370/252

* cited by examiner

Primary Examiner—Kwang Bin Yao

(57) ABSTRACT

Systems and techniques for enabling packet networks to carry time-sensitive data in an efficient manner are described. A packet traverses a packet network through the creation of a packet network tunnel. Each router can propose, and establish if possible, a detour tunnel around the failure without the knowledge or consent of a tunnel manager. Establishment and maintenance of packet network tunnels is also prioritized so any packet network tunnel authorized by the tunnel manager has precedence over any packet network tunnel initiated by a router without the authorization of the tunnel manager.

16 Claims, 5 Drawing Sheets

METHOD AND APPARATUS FOR PACKET NETWORK TUNNEL MANAGEMENT

FIELD OF THE INVENTION

The present invention relates to packet networks in general, and, more particularly, to a technique for managing the establishment and maintenance of packet network tunnels in a packet network.

BACKGROUND OF THE INVENTION

In a packet network, the finite speed of light and the finite speed at which routers can operate precludes the traversal of a packet from one side of the network to another instantaneously. Therefore, there is always some delay between when a transmitting network terminal transmits a packet and when the receiving network terminal receives the packet.

In some cases, this delay is unimportant. For example, some data (e.g., most e-mail messages, etc.) is not perishable or highly time-sensitive and the sender and receiver of the data might consider it unimportant whether the packet takes 5 milliseconds, 5 seconds or even 5 minutes to traverse the network. In contrast, other data (e.g., voice, full-motion video, instant messaging, etc.) is perishable or highly time-sensitive, and, therefore, the sender and receiver of the data might consider it very important that the packets traverse the network quickly.

When packet networks were originally conceived and designed and constructed, little or no consideration was given to ensuring that a fixed number of packets could be sent across a packet network with a maximum delay. Average delays were considered, and packet networks were engineered to consider average delays, but little or no consideration was given to engineering the maximum delay.

Increasingly, however, packet networks are being considered for carrying time-sensitive data for applications such as Internet telephony and television broadcasting. In these applications, the packet networks must be capable of delivering a fixed quantity of packets with a maximum delay. But because the packet networks were not designed to do this, there exists the need for techniques to do so and to do so in an efficient manner.

SUMMARY OF THE INVENTION

The present invention enables packet networks to carry time-sensitive data in an efficient manner without some of the costs and disadvantages associated with techniques in the prior art.

In particular, the illustrative embodiment of the present invention ensures that a packet traverses a packet network quickly through the creation of a "packet network tunnel." A packet network tunnel is a dedication of packet network resources through one or more successive routers for packets traveling from a source to a destination to the exclusion of other packets. An analogy is high occupancy vehicle lanes and bus lanes on congested highways.

Typically, a packet network can comprise many packet network tunnels at any moment, and if each edge router established its own packet network tunnels without regard to the packet network tunnels created by other edge routers, then the packet network's resources (i.e., bandwidth utilization) will be inefficiently allocated and results in a more costly network since the network utilization is suboptimal. The result is that although the packets in packet network tunnels move through the network in an unimpeded fashion, the haphazard and uncoordinated creation of packet network tunnels exacerbates the congestion and delay for packets that are not carried in tunnels.

To alleviate the problems that result from the uncoordinated creation of packet network tunnels, the illustrative embodiment also comprises a "tunnel manager" whose responsibility is to coordinate, in a globally advantageous way, the establishment and maintenance of a plurality of packet network tunnels in a packet network.

Occasionally, a router or telecommunications link fails, which might cause one or more of the tunnels to break. In such cases, the tunnel manager is advantageously apprised of the failure so that it can plan and establish detour tunnels around the failure. As a practical matter, however, it is too costly and too technically difficult to keep the tunnel manager apprised of each router and link failure and restoration in real-time. Furthermore, depending on the algorithms that the tunnel manager uses to plot each tunnel and the computing resources available to it, the tunnel manager might not be able to plan and establish a detour tunnel before the failure is restored and the detour tunnel becomes unnecessary. Therefore, it is typically not advantageous to use the tunnel manager to address temporary network failures.

Therefore, in accordance with the illustrative embodiment, each of routers in the illustrative embodiment is capable of proposing, and establishing if possible, one or more detour tunnels around the failure without the knowledge or consent of the tunnel manager. This is advantageous because it enables the packet network to address failures quickly.

The detour tunnels consume network resources, however, and when the tunnel manager authorizes the establishment of a new tunnel, a detour tunnel might consume so many resources that the new tunnel cannot be established. This largely defeats the advantage of having the tunnel manager coordinate the establishment of tunnels in the first place. In other words, since temporary failures in the packet network must be addressed in real-time and because the tunnel manager is not capable of responding to temporary failures in real time, then any advantages that are gained by the tunnel manager in coordinating the creation of tunnels is largely lost by allowing individual routers to create detour tunnels.

The illustrative embodiment of the present invention overcomes this dilemma by prioritizing the establishment and maintenance of packet network tunnels so that any packet network tunnel "authorized" by the tunnel manager has precedence over router resources over any packet network tunnel that is initiated by a router without the authorization of the tunnel manager. The germane consequence of this precedence is that when the tunnel manager directs the establishment of a packet network tunnel, but a router in the proposed tunnel has insufficient resources to allocate to the proposed tunnel because its resources are consumed by an existing "unauthorized" tunnel, the unauthorized tunnel is torn down at the router and its resources are cannibalized for use by the authorized tunnel. This precedence of authorized packet network tunnels over unauthorized packet network tunnels enables individual routers to address temporary failures in real-time, while enabling the tunnel manager to maintain control over the packet network and without having to keep the tunnel manager apprised of router and link failures and restorations in real-time.

The illustrative embodiment of the present invention comprises: a switching fabric; and a controller for maintaining a existing packet network tunnel through the switching fabric and for receiving a request to establish a proposed packet network tunnel through the switching fabric; wherein the controller accords a higher priority to maintaining the existing packet network tunnel than to establishing the proposed packet network tunnel when: the existing packet network tunnel is authorized by a tunnel manager; and the proposed packet network tunnel is unauthorized by the tunnel manager.

DETAILED DESCRIPTION

Figure 1:
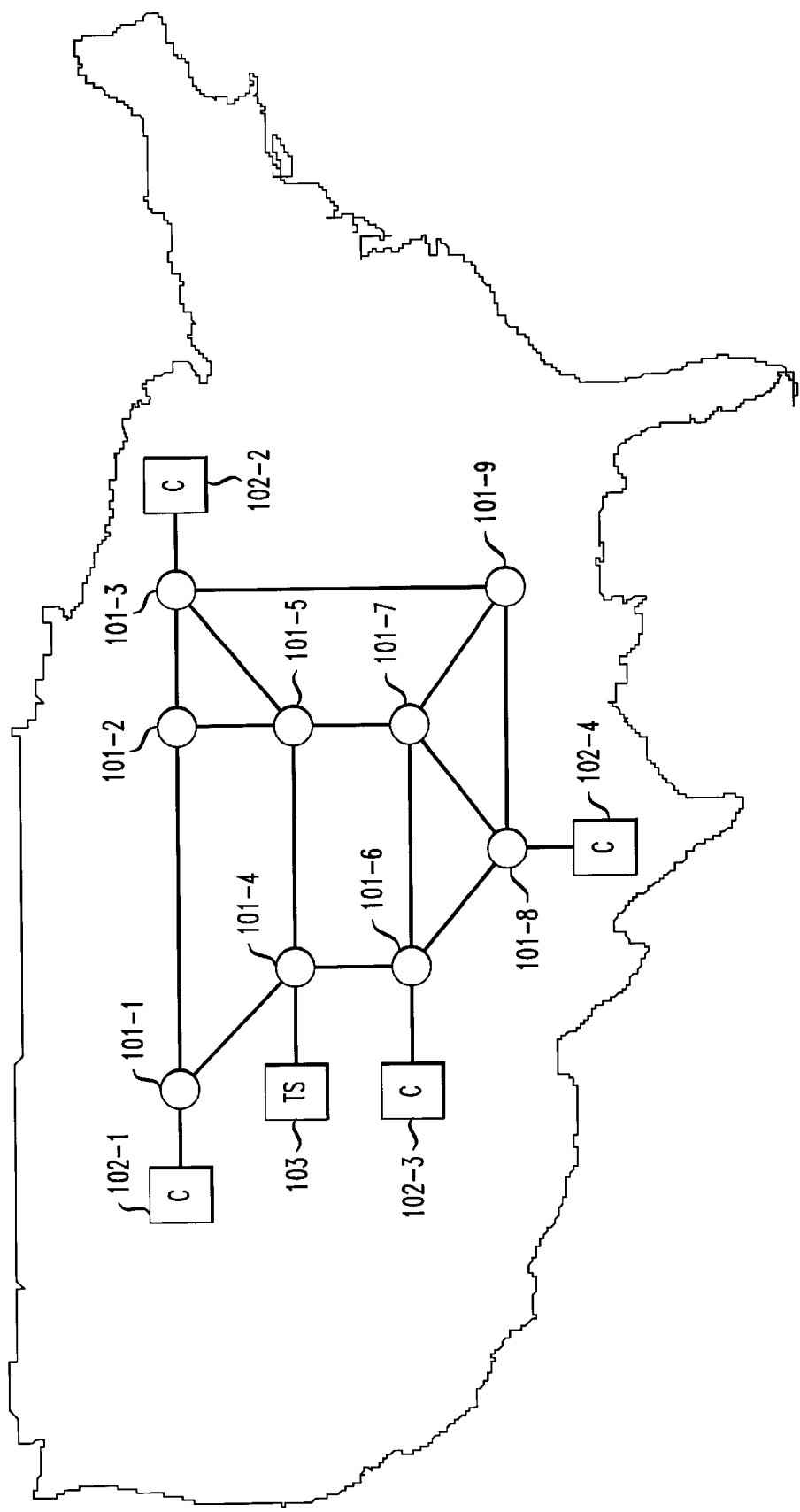
FIG. 1 depicts a packet network in accordance with the illustrative embodiment of the present invention.

FIG. 1 depicts a packet network in accordance with the illustrative embodiment of the present invention, which comprises nine routers, router 101-1 through 101-9, that are interconnected with bi-directional telecommunications links as shown. Although the illustrative embodiment is depicted with only nine routers, it will be clear to those skilled in the art how to make and use embodiments of the present invention that comprise any number of routers that are interconnected in any topology.

Although the packet network depicted in FIG. 1 is represented as spanning a substantial portion of the continental United States, embodiments of the present invention can be either a local-area network (often called a "LAN") or a wide-area network (often called a "WAN"). Furthermore, embodiments of the present invention can be a part of the Internet, or connected to the Internet. As will be clear to those skilled in the art, embodiments of the present invention can use any protocol suite (e.g., TCP/IP, ATM, etc.) and any computing technology. Furthermore, the telecommunications links can use any wireline (e.g., copper, optical fiber, etc.) or wireless (e.g., satellite, terrestrial, etc.) technology.

Because the nomenclature of packet networking is not well standardized, a router is also sometimes called a "packet switch," "datagram switch," "cell switch," "ATM switch," "gateway," "firewall," or "bridge" depending on the purpose for which the router is being used and on the educational and industrial background of the person using the term. However, for the purposes of this specification, a "router" is defined as a switch that is capable of receiving a packet that comprises an address and of routing that packet to an output based on that address.

Figure 2:
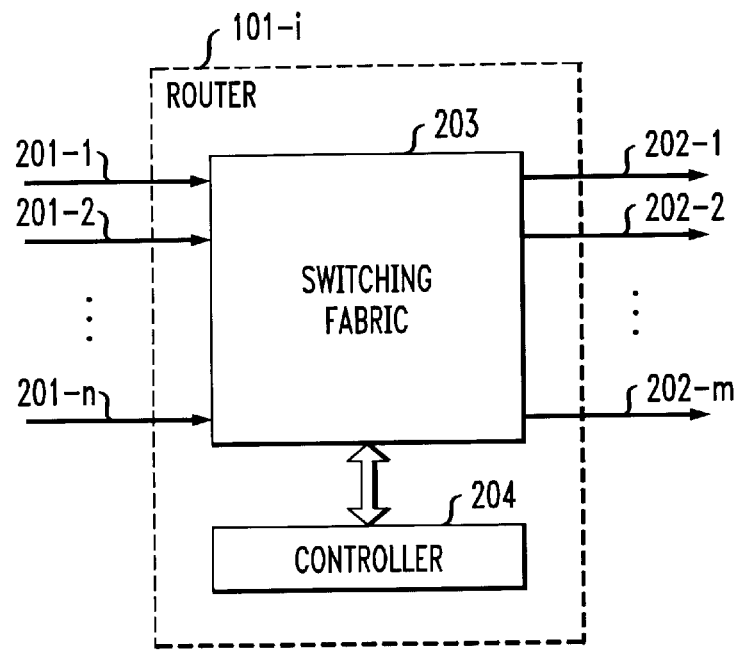
FIG. 2 depicts a block diagram of router 101-$i$ in accordance with the illustrative embodiment of the present invention.

FIG. 2 depicts a block diagram of router 101-$i$, for $1 \leq i \leq 9$, in accordance with the illustrative embodiment of the present invention. Router 101-$i$ comprises: one or more inputs labeled 201-1 through 201-$n$, where n is an integer greater than zero, one or more outputs labeled 202-1 through 202-$m$, where m is an integer greater than one, switching fabric 203, and controller 204.

Router 101-$i$ receives packets on inputs 201-1 through 201-$n$ and transmits packets on outputs 202-1 through 202-$m$. Switching fabric 203 examines the incoming packets, temporally buffers them, if necessary, and routes them to either the appropriate output or to controller 204. Packets carrying messages affecting the operation, administration, or maintenance of router 101-$i$ are forwarded by switching fabric 203 to controller 204. Furthermore, controller 204 is capable of creating packets and forwarding packets and of transmitting them through switching fabric 203 to one or more of outputs 202-1 through 202-$m$. Switching fabric 203 comprises -one or more space-division switches, one or more time-division switches, or any combination of space-division and time-division switches, as is well-known to those skilled in the art. Controller 204 comprises one or more processors that are capable of orchestrating the operation of switching fabric 203 and of performing the functionality described in this specification.

Five network terminals, network terminal 102-1 through 102-4 and tunnel manager 103, are connected to the packet network in FIG. 1, and each is capable of providing packets to, and of receiving packets from, one of the nine routers. In a typical packet network and in the illustrative packet network depicted in FIG. 1, some routers communicate directly with network terminals while other do not. For the purposes of this specification, a router that communicates directly with a network terminal is defined as an "edge router." Routers 101-1, 101-3, 101-4, 101-6 and 101-8 in FIG. 1 are, therefore, edge routers. Conversely, some routers in a typical packet network and in the illustrative packet network depicted in FIG. 1 communicate directly only with other routers and not directly with network terminals. For the purposes of this specification, a router that communicates directly only with other routers and not directly with network terminals is defined as a "network router." Routers 101-2, 101-5, 101-7, and 101-9 in FIG. 1 are, therefore, network routers.

In accordance with the illustrative embodiment of the present invention, data is transmitted from one network terminal to another via the packet network. The data can be of any length and can represent any type of information (e.g., text, images, voice, full-motion video, etc.). If there is very little data, one packet might be sufficient to hold all of the data associated with a single message. In contrast, if there is more data, it will be divided and transmitted in a series of packets, which are reassembled by the receiving network terminal into the original message.

Each packet is routed through the packet network independently of every other packet. This is true even when two packets comprise successive portions of a single message and one packet follows the other through the network. As is depicted in Table 1, each packet is capable of being independently routed through a packet network because it comprises an address that is indicative of its destination. Typically, the payload comprises information that enables the receiving network terminal to reassemble multiple packets that are part of a single message back into the message.

TABLE 1

| Format of a Packet | |
|---|---|
| Data Payload | Address |

For the purposes of this specification, a "packet" is defined as a message that comprises a data payload and an address. When packets are small and all of the same size, they are often called "cells."

Because of the finite speed of light and the finite speed at which switching fabric 203 can operate, a packet network cannot transport a packet from one network terminal to another instantaneously. Therefore, there is always some delay between when a transmitting network terminal transmits a packet and when the receiving network terminal receives the packet.

In some cases, this delay is unimportant. For example, some data (e.g., most e-mail messages, etc.) is not perishable or highly time-sensitive and the sender and receiver of the data might consider it unimportant whether the packet takes 5 milliseconds, 5 seconds or even 5 minutes to traverse the network. In contrast, other data (e.g., voice, full-motion video, instant messaging, etc.) is perishable or highly time-sensitive, and, therefore, the sender and receiver of the data might consider it very important that the packets traverse the network quickly.

There are many factors that affect how long it takes for a packet to traverse a network. It should be noted, however, that the speed at which a packet travels along a telecommunications link is generally not one of those factors. Rather, the significant factors pertain to: (1) how long it takes each packet to traverse each router on its journey from source to destination, and (2) how many routers the packets must traverse on its journey from source to destination. And, in general, both of these factors are affected by congestion. In other words, when the packet network is carrying a great deal of traffic, many packets will traverse more routers than they might when there is less traffic, and many packets will wait longer in some routers than they might when there is less traffic.

One technique for ensuring that a packet traverses a packet network quickly involves the creation of a "packet network tunnel." For the purposes of this specification, the terms "packet network tunnel" and "tunnel" are synonyms and are both defined as a dedication of resources through one or more successive routers for packets traveling from a source to a destination to the exclusion of other packets.

For example, if network terminal 102-3 in FIG. 1 desires to transmit 20,000 packets per second to network terminal 102-2 through the packet network with a maximum of a 100 millisecond delay and without regard to any congestion that might exist in the network, network terminal 102-3 can request that router 101-6 create a packet network tunnel through the network with a 20,000 packet per second capacity and a maximum delay of 100 milliseconds. In other words, router 101-6 can organize a chain of routers from network terminal 102-2 to network terminal 102-3 to set aside or dedicate enough resources to carry 20,000 packets per second with less than a 100 millisecond delay from network terminal 102-2 to network terminal 102-3 regardless of any other traffic on the network.

To accomplish this, router 101-6 creates a route from network terminal 102-3 to network terminal 102-2 (e.g., through router 101-7, 101-5, and 101-3, etc.) in which each router on the route allocates the resources needed to carry 20,000 packets per second with less than a 100 millisecond delay. If router 101-6 is successful, the packet network tunnel is created and maintained until network terminal 102-3 indicates that it is no longer needed, or until it is torn down so that its resources can be cannibalized for use by another tunnel with a higher priority.

Typically, a packet network can comprise many packet network tunnels at any moment, and if each edge router established its own packet network tunnels without regard to the packet network tunnels created by other edge routers, then the packet network's resources (i.e., bandwidth utilization) will be, from an overall network perspective, inefficiently allocated. The result is that although the packets in packet network tunnels move through the network in an unimpeded fashion, the haphazard and uncoordinated creation of packet network tunnels exacerbates the congestion and delay for packets that are not carried in tunnels.

To alleviate the problems that result from the uncoordinated creation of packet network tunnels, the illustrative embodiment also comprises tunnel manager 103. For the purposes of this specification, a "tunnel manager" is defined as an entity whose responsibility is to coordinate the establishment and maintenance of a plurality of packet network tunnels in a packet network. In accordance with the illustrative embodiment of the present invention, tunnel manager 103 knows all of the resource (e.g., bandwidth, latency; etc.) characteristics of all of the routers and telecommunications links in the packet network.

Therefore, in accordance with the illustrative embodiment, if network terminal 102-3 desires to transmit 20,000 packets per second to network terminal 102-2 through the packet network with a maximum of a 100 millisecond delay, router 101-6 sends a request for a packet network tunnel of the desired bandwidth and latency to tunnel manager 103. Tunnel manager 103 analyzes the network resources and the existing tunnels and returns instructions to router 101-6 on how to create that tunnel Typically, those instructions include: (1) a priority level for the tunnel, and (2) the identities of the routers through which the tunnel is to go. More will be said about the priority level for tunnels below. Furthermore, it should be made clear that a single router can have a plurality of authorized tunnels and a plurality of unauthorized tunnels through it at any time.

Occasionally, a router or telecommunications link temporarily fails and some of the tunnels become broken by the failure. In such cases, tunnel manager might be advantageously apprised of the failure so that it plan and establish detour tunnels around the failure.

As a practical matter, however, it might be too costly and technically difficult to keep tunnel manager 103 apprised of each router and link failure and restoration in real-time. Furthermore, depending on the algorithms that tunnel manager 103 uses to plot each tunnel and the computing resources available to tunnel manager 103, tunnel manager 103 might not be able to plan and establish the detour tunnels before the failure is restored and the detour tunnels become unnecessary. Therefore, it is not typically advantageous to use tunnel manager 103 to address temporary network failures. On the other hand, some mechanism must exist for addressing temporary network failures or the integrity of the entire network will fail.

Therefore, in accordance with the illustrative embodiment, each of routers 101-1 through 101-9 is capable of proposing, and establishing if possible, one or more detour tunnels around the failure without the knowledge or consent of tunnel manager 103. This is advantageous because it enables the network to respond to failures quickly.

The detour tunnels consume network resources, however, and afterwards when tunnel manager 103 authorizes the establishment of a new tunnel, the detour tunnels might consume so many resources that the new tunnel cannot be established. This largely defeats the advantage of having tunnel manager 103 coordinate the establishment of tunnels in the first place. In other words, since temporary failures in the packet network must be addressed in real-time and because tunnel manager 103 is not capable of responding to temporary failures in real time, then any advantages that are gained by tunnel manager 103 in coordinating the creation of tunnels is largely lost by allowing individual routers to create detour tunnels.

The illustrative embodiment of the present invention overcomes this dilemma by prioritizing the establishment and maintenance of packet network tunnels so that any packet network tunnel authorized by tunnel manager 103 has precedence over router resources over any packet network tunnel that is initiated by a router without the authorization of tunnel manager 103. The germane consequence of this is that when tunnel manager 103 directs the establishment of a proposed authorized packet network tunnel, but a router in the tunnel has insufficient resources to allocate to the tunnel because its resources are consumed by an existing unauthorized packet network tunnel, the existing unauthorized packet network tunnel is torn down at the router and its resources are cannibalized for use by the authorized packet network tunnel. This precedence of authorized packet network tunnels over unauthorized packet network tunnels enables individual routers to address temporary failures in real-time, while enabling tunnel manager 103 to maintain control over the packet network and without having to keep tunnel manager 103 apprised of router and link failures and restorations in real-time.

Furthermore, when tunnel manager 103 authorizes a tunnel it assigns a priority to that tunnel. More specifically, it assigns a priority to any detour or derivative unauthorized tunnels that might be established to overcome a break in the original authorized tunnel so that the routers are guided in how to allocate their resources among a plurality of unauthorized tunnels. This does not mean that an unauthorized tunnel can have a higher priority than an authorized tunnel, but only that when a router has insufficient resources for multiple unauthorized tunnels, the priority indicates how the router should allocate its resources among those multiple unauthorized tunnels.

Figure 3:
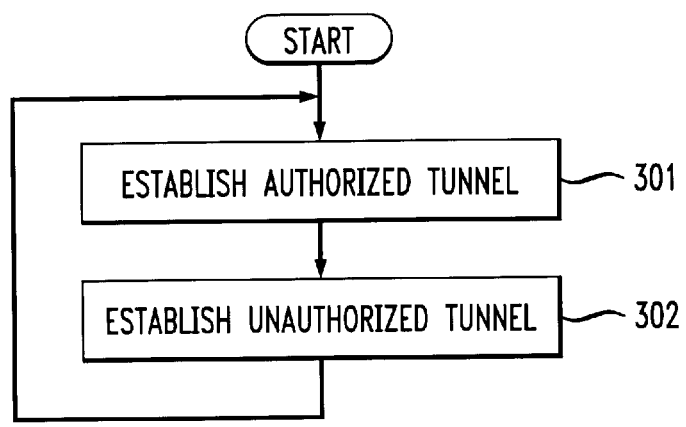
FIG. 3 depicts a flowchart of the operation of router 101-$i$, wherein $1 \leq i \leq 9$, in accordance with the illustrative embodiment of the present invention.

FIG. 3 depicts a flowchart of the operation of router 101-i, wherein $1 \leq i \leq 9$, in accordance with the illustrative embodiment of the present invention, as it establishes and maintains both authorized and unauthorized tunnels.

Figure 4:
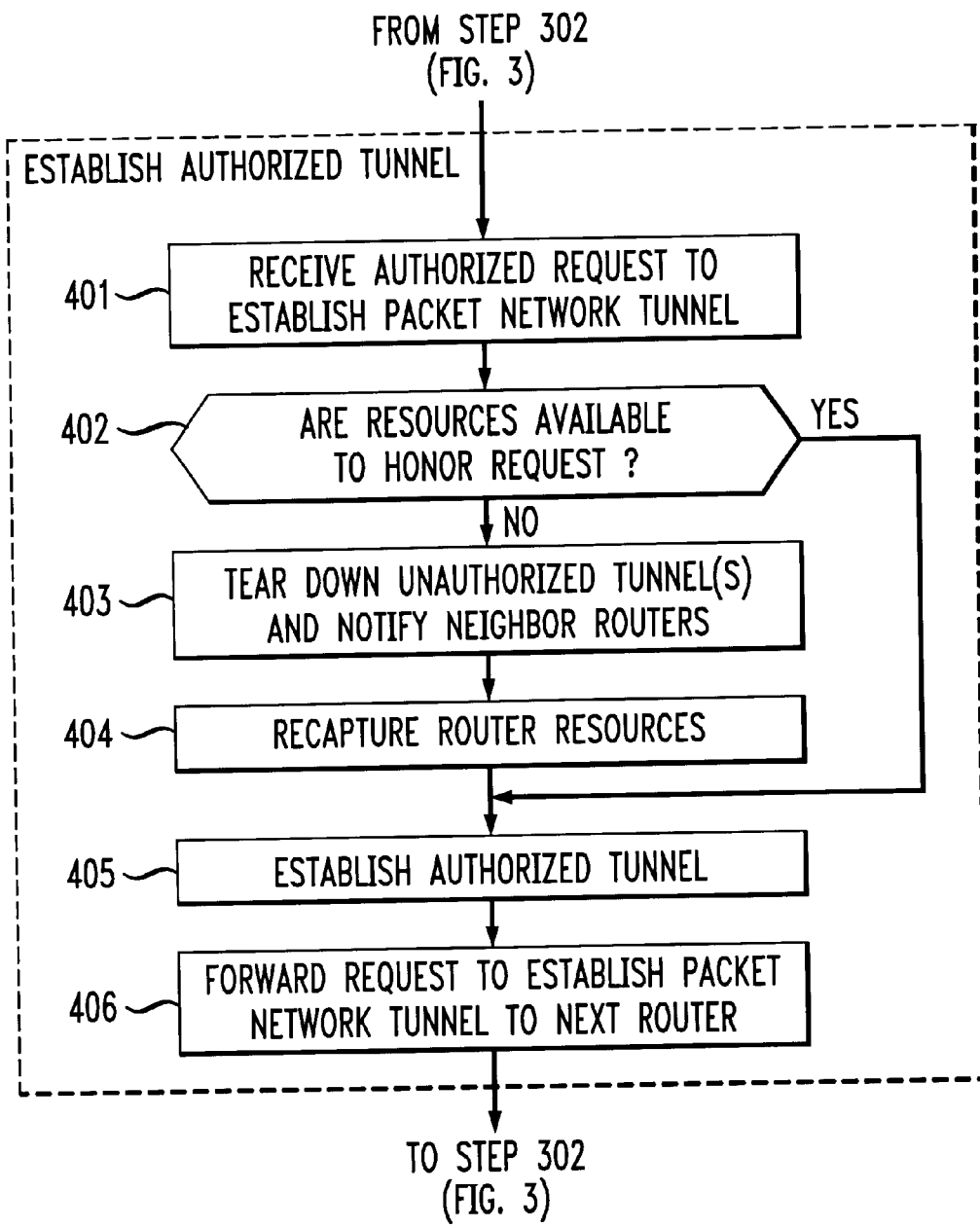
FIG. 4 depicts the details of step 301 of FIG. 3.

As depicted in FIG. 3, there are two processes that routers in accordance with the illustrative embodiment must perform. At step 301, router 101-i establishes an authorized packet network tunnel. Step 301 is shown in greater detail in FIG. 4.

At step 401, router 101-i receives a request to establish a packet network tunnel that is authorized by tunnel manager 103. This request can come directly from tunnel manager 103, or it can be forwarded from another router as part of the process of establishing the tunnel. The request will specify the bandwidth and latency requirements of the tunnel and the tunnel priority.

At step 402, router 101-i determines if it has the resources immediately available (i.e., without necessitating the tearing down of another tunnel to cannibalize its resources) to honor the request. If it does, then control passes to step 405; otherwise control passes to step 403.

Because the request to establish the packet network tunnel is authorized by tunnel manager 103 and because tunnel manager 103 knows the capacity of router 101-i, the request to establish the tunnel cannot be denied, and, therefore, router 101-i must find the resources to honor the request.

At step 403, router 101-i tears down one or more unauthorized packet network tunnels so that the resources consumed by those unauthorized tunnels can be re-tasked for the authorized proposed tunnel. Advantageously, router 101-i tears down the unauthorized tunnels with the lowest priority first and only tears down those tunnels whose resources are actually needed for the establishment of the authorized tunnel. As part of tearing down the unauthorized tunnels, router 101-i notifies the neighboring routers in the unauthorized tunnel(s) that the unauthorized tunnel(s) are being torn down so that they know to re-route, if possible, the unauthorized tunnel around router 101-i.

At step 404, router 101-i recaptures the resources used for the unauthorized tunnel(s) and control passes to step 405.

At step 405, router 101-i establishes the authorized tunnel, and at step 406, router 101-i forwards the authorized request to establish the tunnel to the next router identified in the request. After step 405, control passes to step 302 in FIG. 3.

Figure 5:
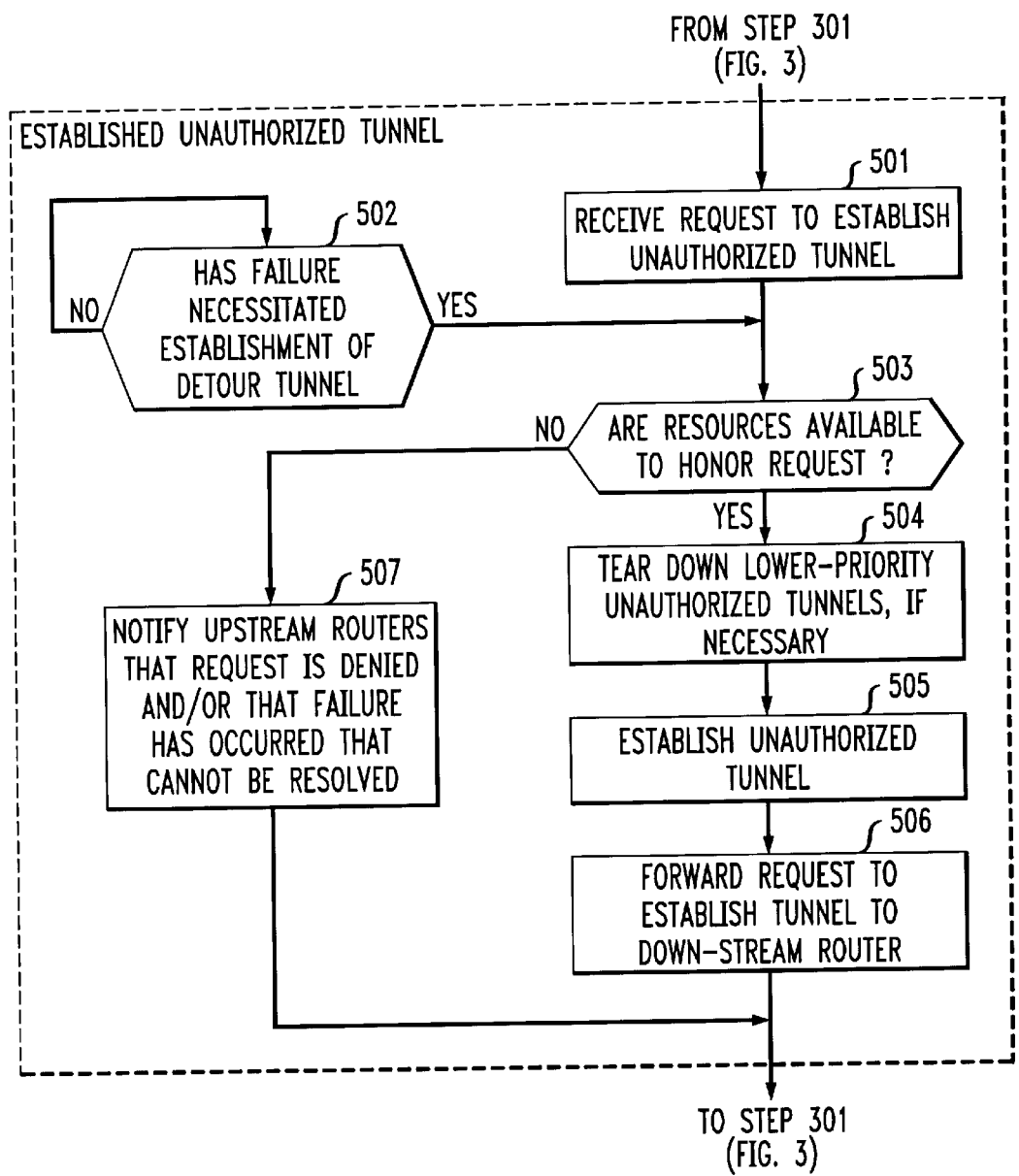
FIG. 5 depicts the details of step 302 of FIG. 3.

At step 302 in FIG. 3, router 101-i establishes an unauthorized packet network tunnel. Step 302 is shown in greater detail in FIG. 5.

At step 501, router 101-i receives a request to establish a packet network tunnel that is unauthorized by tunnel manager 103. The request comes from another router. From step 501, control passes to step 503.

At step 502, router 101-i determines if a telecommunications link or router failure has occurred which necessitates the establishment of a detour (i.e., unauthorized) packet network tunnel around the failure. If a failure is detected, then control passes to step 503.

At step 503, router 101-i determines if it has the resources immediately available to establish the unauthorized proposed tunnel, or if the resources would be available if a lower-priority unauthorized tunnel were torn down and its resources cannibalized for the proposed tunnel. If it does, or would, then control passes to step 504; otherwise control passes to step 507.

At step 504, router 101-i tears down one or more lower-priority unauthorized packet network tunnels, if necessary, so that the resources consumed by those unauthorized tunnels can be re-tasked for the proposed tunnel. Advantageously, router 101-i tears down the unauthorized tunnels with the lowest priority first and only tears down those tunnels whose resources are actually needed for the establishment of the proposed tunnel. As part of tearing down the unauthorized tunnels, router 101-i notifies the neighboring routers in the unauthorized tunnel(s) that the unauthorized tunnel(s) are being torn down so that they know to re-route the unauthorized tunnel around router 101-i.

At step 505, router 101-i establishes the proposed tunnel, and at step 506, router 101-i transmits/forwards the request to establish the tunnel to the next router to perpetuate the tunnel. After step 506, control passes to step 301 in FIG. 3.

At step 507, router 101-i notifies the upstream router that the request is denied and/or that a failure has been detected on an existing tunnel that cannot be resolved by router 101-i. This enables the upstream router to attempt to build a detour tunnel around router 101-i. After step 507, control passes to step 301 in FIG. 3.

Figure 6:
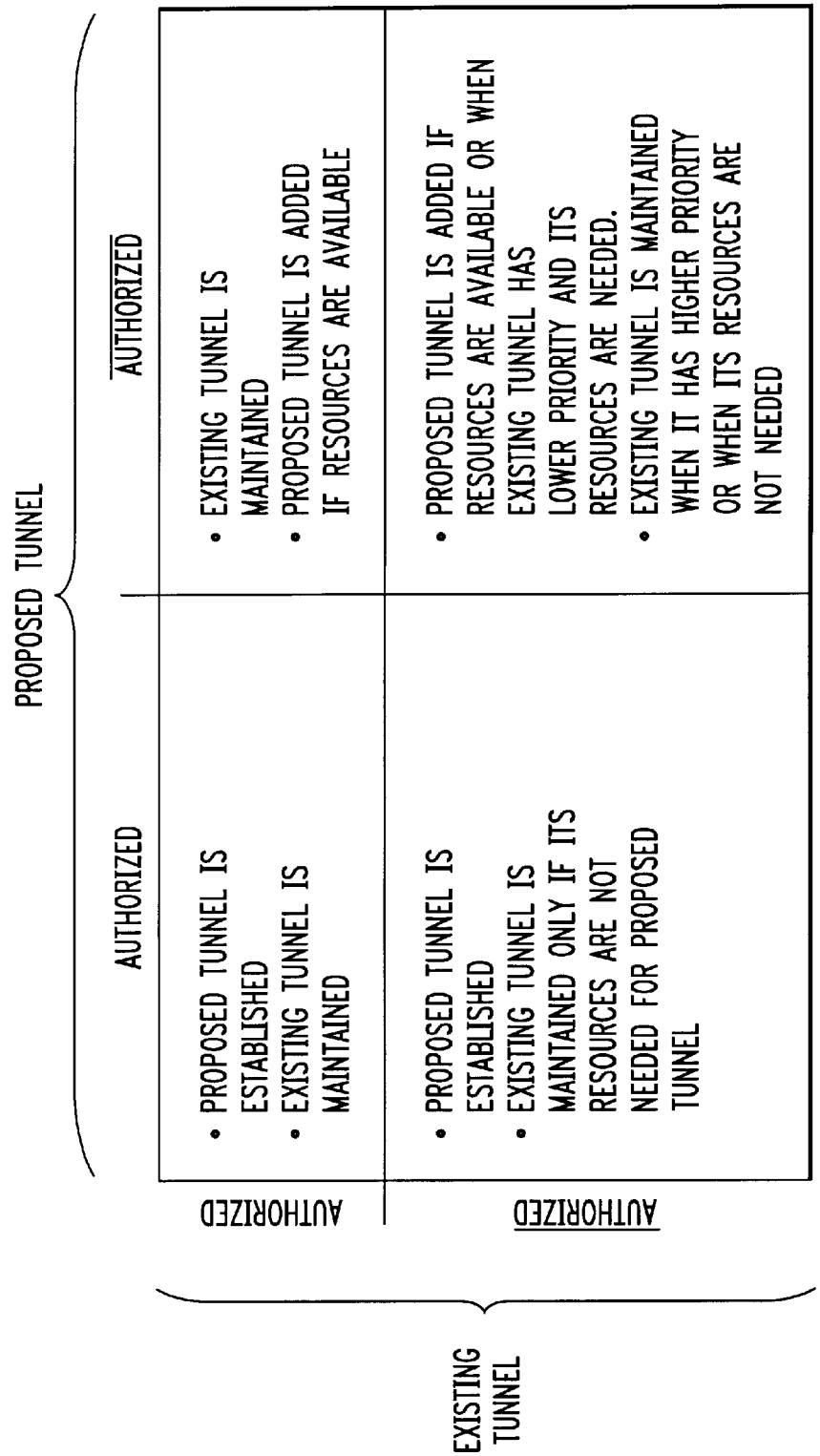
FIG. 6 depicts a truth table that indicates what router 101-$i$ does under various conditions.

FIG. 6 depicts a truth table that summarizes the operation of router-101-i when it is currently maintaining an existing packet network tunnel and it either receives a request to establish a proposed tunnel or it spontaneously attempts to establish an unauthorized proposed tunnel.

As seen in the upper-left quadrant, when both the existing tunnel and the proposed tunnel are both authorized by tunnel manager 103, then the proposed tunnel is established and the existing tunnel is maintained. Because both tunnels are authorized by tunnel manager 103, and because tunnel manager 103 knows the resource capacity of router 101-i, there will always be enough resources available for both tunnels simultaneously.

At seen in the upper-right quadrant, when the existing tunnel is authorized, but the proposed tunnel is not authorized, then the existing tunnel is maintained and the proposed tunnel is added if the resources are available or would be available if lower-priority unauthorized tunnels were torn down and cannibalized.

As seen in the lower-left quadrant, when the existing tunnel is unauthorized and the proposed tunnel is authorized, then the proposed tunnel is established, and the existing tunnel is maintained only if its resources are not needed for the proposed tunnel.

As seen in the lower-right quadrant, when neither the existing tunnel nor the proposed tunnel are authorized, the proposed tunnel is established if the resources are available or would be available if lower-priority unauthorized tunnels were torn down and cannibalized. The existing tunnel is maintained when it has the same or higher priority than the proposed tunnel and when it has a lower priority than the proposed tunnel but its resources are not needed for the proposed tunnel.

Through algebraic reduction, this can be summarized as follows. The proposed packet network tunnel is established by router 101-$i$ in three cases:

Case #1—when the proposed packet network tunnel is authorized.

Case #2—when: (i) the proposed packet network tunnel is unauthorized, and
(ii) the resources needed for the proposed packet network tunnel are available.

Case #3—when: (i) the proposed packet network tunnel is unauthorized, and
(ii) the existing packet network tunnel is unauthorized, and
(iii) the proposed packet network tunnel has a higher priority than the existing packet network tunnel, and
(iv) the resources needed for the proposed packet network tunnel will become available if the existing packet network tunnel is torn down.

Furthermore, the existing packet network tunnel is torn down at router 101-$i$ in when:
(i) the existing packet network tunnel is unauthorized by tunnel manager 103, and
(ii) the existing packet network tunnel has a lower priority than the proposed packet network tunnel, and
(iii) the resources used by the existing packet network tunnel at router 101-$i$ are necessary for establishing the proposed packet network tunnel through router 101-$i$.

By using these rules, router 101-$i$ can address temporary failures in real-time, while enabling tunnel manager 103 to maintain control over the packet network and without having to keep tunnel manager 103 apprised of router and link failures and restorations in real-time.

It is to be understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

What is claimed is:

1. A router comprising:
a switching fabric; and
a controller for maintaining an existing packet network tunnel through said switching fabric and for receiving a request to establish a proposed packet network tunnel through said switching fabric;
wherein said controller accords a higher priority to maintaining said existing packet network tunnel than to establishing said proposed packet network tunnel when:
said existing packet network tunnel is authorized by a tunnel manager, the tunnel manager being dedicated to coordinating the establishment and maintenance of packet network tunnels in the packet network, the tunnel manager being operative to analyze network resources and evaluate allocation of resources to construction of tunnels and to designate existing and proposed tunnels as authorized or unauthorized without intervention by an operator; and
said proposed packet network tunnel is unauthorized by said tunnel manager.

2. The router of claim 1 wherein said controller accords a higher priority to establishing said proposed packet network tunnel than to maintaining said existing packet network tunnel when:
said proposed packet network tunnel is authorized by said tunnel manager; and
said existing packet network tunnel is unauthorized by said tunnel manager.

3. The router of claim 1 wherein said controller accords a higher priority to maintaining said existing packet network tunnel than to establishing said proposed packet network tunnel when:
neither said existing packet network tunnel nor said proposed packet network tunnel is authorized by said tunnel manager; and
said existing packet network tunnel has a higher priority than said proposed packet network tunnel.

4. The router of claim 1 wherein said controller accords a higher priority to establishing said proposed packet network tunnel than to maintaining said existing packet network tunnel when:
neither said existing packet network tunnel nor said proposed packet network tunnel is authorized by said tunnel manager; and
said proposed packet network tunnel has a higher priority than said existing packet network tunnel.

5. A router comprising:
a switching fabric; and
a controller for maintaining an existing packet network tunnel through said switching fabric and for receiving a request to establish a proposed packet network tunnel through said switching fabric;
wherein said controller accords a higher priority to establishing said proposed packet network tunnel than to maintaining said existing packet network tunnel when:
said proposed packet network tunnel is authorized by a tunnel manager dedicated to coordinating the establishment and maintenance of packet network tunnels in the packet network, the tunnel manager being dedicated to coordinating the establishment and maintenance of packet network tunnels in the packet network, the tunnel manager being operative to analyze network resources and evaluate allocation of resources to construction of tunnels and to designate existing and proposed tunnels as authorized or unauthorized without intervention by an operator; and
said existing packet network tunnel is unauthorized by said tunnel manager.

6. The router of claim 5 wherein said controller accords a higher priority to maintaining said existing packet network tunnel than to establishing said proposed packet network tunnel when:
said existing packet network tunnel is authorized by a tunnel manager; and said proposed packet network tunnel is unauthorized by said tunnel manager.

7. The router of claim 5 wherein said controller accords a higher priority to maintaining said existing packet network tunnel than to establishing said proposed packet network tunnel when:
   neither said existing packet network tunnel nor said proposed packet network tunnel is authorized by said tunnel manager; and
   said existing packet network tunnel has a higher priority than said proposed packet network tunnel.

8. The router of claim 5 wherein said controller accords a higher priority to establishing said proposed packet network tunnel than to maintaining said existing packet network tunnel when:
   neither said existing packet network tunnel nor said proposed packet network tunnel is authorized by said tunnel manager; and
   said proposed packet network tunnel has a higher priority than said existing packet network tunnel.

9. A method comprising:
   maintaining an existing packet network tunnel through a router;
   receiving a request to establish a proposed packet network tunnel through said router; and
   establishing said proposed packet network tunnel through said router when said proposed packet network tunnel is authorized by a tunnel manager dedicated to coordinating the establishment and maintenance of packet network tunnels in the packet network, the tunnel manager being dedicated to coordinating the establishment and maintenance of packet network tunnels in the packet network, the tunnel manager being operative to analyze network resources and evaluate allocation of resources to construction of tunnels and to designate existing and proposed tunnels as authorized or unauthorized without intervention by an operator.

10. The method of claim 9 further comprising establishing said proposed packet network tunnel through said router when:
   i. said proposed packet network tunnel is unauthorized by said tunnel manager, and
   ii. the resources necessary for establishing said proposed packet network tunnel through said router are available without tearing down said existing packet network tunnel.

11. The method of claim 9 further comprising establishing said proposed packet network tunnel through said router when:
   i. said proposed packet network tunnel is unauthorized by said tunnel manager,
   ii. said proposed packet network tunnel has a higher priority than said existing packet network tunnel, and
   iii. the resources necessary for establishing said proposed packet network tunnel through said router would be available if said existing packet network tunnel is torn down at said router.

12. The method of claim 9 further comprising tearing down said existing packet network tunnel at said router when:
   i. said existing packet network tunnel is unauthorized by said tunnel manager; and
   ii. said existing packet network tunnel has a lower priority than said proposed packet network tunnel; and
   iii. the resources use by said existing packet network tunnel at said router are necessary for establishing said proposed packet network tunnel through said router.

13. A method comprising:
   maintaining an existing packet network tunnel through a router;
   receiving a request to establish a proposed packet network tunnel through said router; and
   comprising tearing down said existing packet network tunnel at said router when:
   i. said existing packet network tunnel is unauthorized by a tunnel manager dedicated to coordinating the establishment and maintenance of packet network tunnels in the packet network, the tunnel manager being dedicated to coordinating the establishment and maintenance of packet network tunnels in the packet network, the tunnel manager being operative to analyze network resources and evaluate allocation of resources to construction of tunnels and to designate existing and proposed tunnels as authorized or unauthorized without intervention by an operator;
   ii. said existing packet network tunnel has a lower priority than said proposed packet network tunnel; and
   iii the resources used by said existing packet network tunnel at said router are necessary for establishing said proposed packet network tunnel through said router.

14. The method of claim 13 further comprising establishing said proposed packet network tunnel through said router when said proposed packet network tunnel is authorized by a tunnel manager.

15. The method of claim 13 further comprising establishing said proposed packet network tunnel through said router when:
   i. said proposed packet network tunnel is unauthorized by said tunnel manager, and
   ii. the resources necessary for establishing said proposed packet network tunnel through said router are available without tearing down said existing packet network tunnel.

16. The method of claim 13 further comprising establishing said proposed packet network tunnel through said router when:
   i. said proposed packet network tunnel is unauthorized by said tunnel manager;,
   ii. said proposed packet network tunnel has a higher priority than said existing packet network tunnel; and
   iii. the resources necessary for establishing said proposed packet network tunnel through said router would be available if said existing packet network tunnel is torn down at said router.

* * * * *